United States Patent
Molter et al.

(10) Patent No.: US 7,169,493 B2
(45) Date of Patent: Jan. 30, 2007

(54) FUEL CELL SYSTEM WITH THERMAL MANAGEMENT AND METHOD OF OPERATION THEREOF

(75) Inventors: Trent Molter, Glastonbury, CT (US); Mark Lillis, South Windsor, CT (US); Spyros Nomikos, New Britain, CT (US)

(73) Assignee: Proton Energy Systems, Inc., Wallingford, CT (US)

( * ) Notice: Subject to any disclaimer, the term of this patent is extended or adjusted under 35 U.S.C. 154(b) by 594 days.

(21) Appl. No.: 10/426,422

(22) Filed: Apr. 30, 2003

(65) Prior Publication Data
US 2004/0219407 A1 Nov. 4, 2004

(51) Int. Cl.
*H01M 8/06* (2006.01)
*H01M 8/04* (2006.01)

(52) U.S. Cl. .................. 429/21; 429/22; 429/24; 429/26; 204/DIG. 4

(58) Field of Classification Search .................. None
See application file for complete search history.

(56) References Cited

U.S. PATENT DOCUMENTS

| | | | |
|---|---|---|---|
| 4,510,756 A | 4/1985 | Hise et al. ............. 60/659 |
| 5,678,410 A | 10/1997 | Fujita et al. ............. 62/7 |
| 5,728,483 A | 3/1998 | Fujitani et al. ............. 429/12 |
| 6,495,025 B1 | 12/2002 | Velev ............. 205/633 |
| 2004/0058215 A1 * | 3/2004 | Bruck et al. ............. 429/32 |

FOREIGN PATENT DOCUMENTS

| | | |
|---|---|---|
| DE | 10065304 A1 * | 7/2002 |
| JP | 2001-057222 * | 2/2001 |
| WO | WO 01/76941 A2 | 10/2001 |

* cited by examiner

*Primary Examiner*—Jonathan Crepeau
(74) *Attorney, Agent, or Firm*—Cantor Colburn LLP (57) ABSTRACT

A fuel cell system includes a fuel cell apparatus and a heat storage device. The heat storage device is in fluid communication with and responsive to the fuel cell apparatus and is adapted to receive and store heat from and deliver heat to the fuel cell apparatus.

8 Claims, 6 Drawing Sheets

FUEL CELL SYSTEM WITH THERMAL MANAGEMENT AND METHOD OF OPERATION THEREOF

BACKGROUND OF THE INVENTION

The present disclosure relates generally to fuel cell systems, and particularly to thermal management of fuel cell systems.

Fuel cell systems may employ electrolysis modules in combination with fuel cell modules, thereby providing a regenerative fuel cell system. A typical fuel cell module receives hydrogen fuel, from either the electrolysis module or through an intermediate hydrogen storage device, and oxygen to generate electricity and product water, while a typical electrolysis module receives process water from a water storage device and electricity to produce hydrogen, oxygen, and byproduct water. Another byproduct of both the electrolysis and fuel cell modules is heat, which is typically distributed throughout the fuel cell system via the product and process water. With the presence of water, it is preferable to operate the fuel cell system at a temperature above the freezing temperature of water, typically zero degree Celsius but with some variation depending on pressure. However, in cold climates or at high altitudes, such cold temperatures are unavoidable. With high altitude airships (HAA), for example, the ambient temperature may reach as low as −55 degree-Celsius or below. In such environments, auxiliary heating systems, such as electric heaters, may be used to prevent water freezing. However, such auxiliary systems have high energy demands. Accordingly, it would be advantageous to have an intelligent fuel cell system that can utilize available thermal energy to maintain operating temperatures above the freezing temperature of water.

SUMMARY OF THE INVENTION

In one embodiment, a fuel cell system includes a fuel cell apparatus and a heat storage device. The heat storage device is in fluid communication with and responsive to the fuel cell apparatus and is adapted to receive and store heat from and deliver heat to the fuel cell apparatus.

In another embodiment, a method of storing and transferring heat within a fuel cell system includes transferring heat originating from an electrolysis module, a fuel cell module, or a hydrogen storage device, to a heat storage device and storing the heat thereat, and transferring heat from the heat storage device to the electrolysis module, the fuel cell module, the hydrogen storage device or a water storage device. In so doing, the temperatures of the electrolysis module, the fuel cell module, the hydrogen storage device and the water storage device are maintained above a predefined temperature.

In a further embodiment, a fuel cell system includes a fuel cell apparatus, means for storing a portable heat transfer medium, and means for communicating the portable heat transfer medium between a heat storage device and the fuel cell apparatus.

BRIEF DESCRIPTION OF THE DRAWINGS

Referring to the exemplary drawings wherein like elements are numbered alike in the accompanying Figures.

DETAILED DESCRIPTION OF THE INVENTION

An embodiment of the invention provides a fuel cell system having a thermal management arrangement for maintaining the temperature of the fuel cell system components above a predefined temperature, such as freezing for example.

Figure 1:
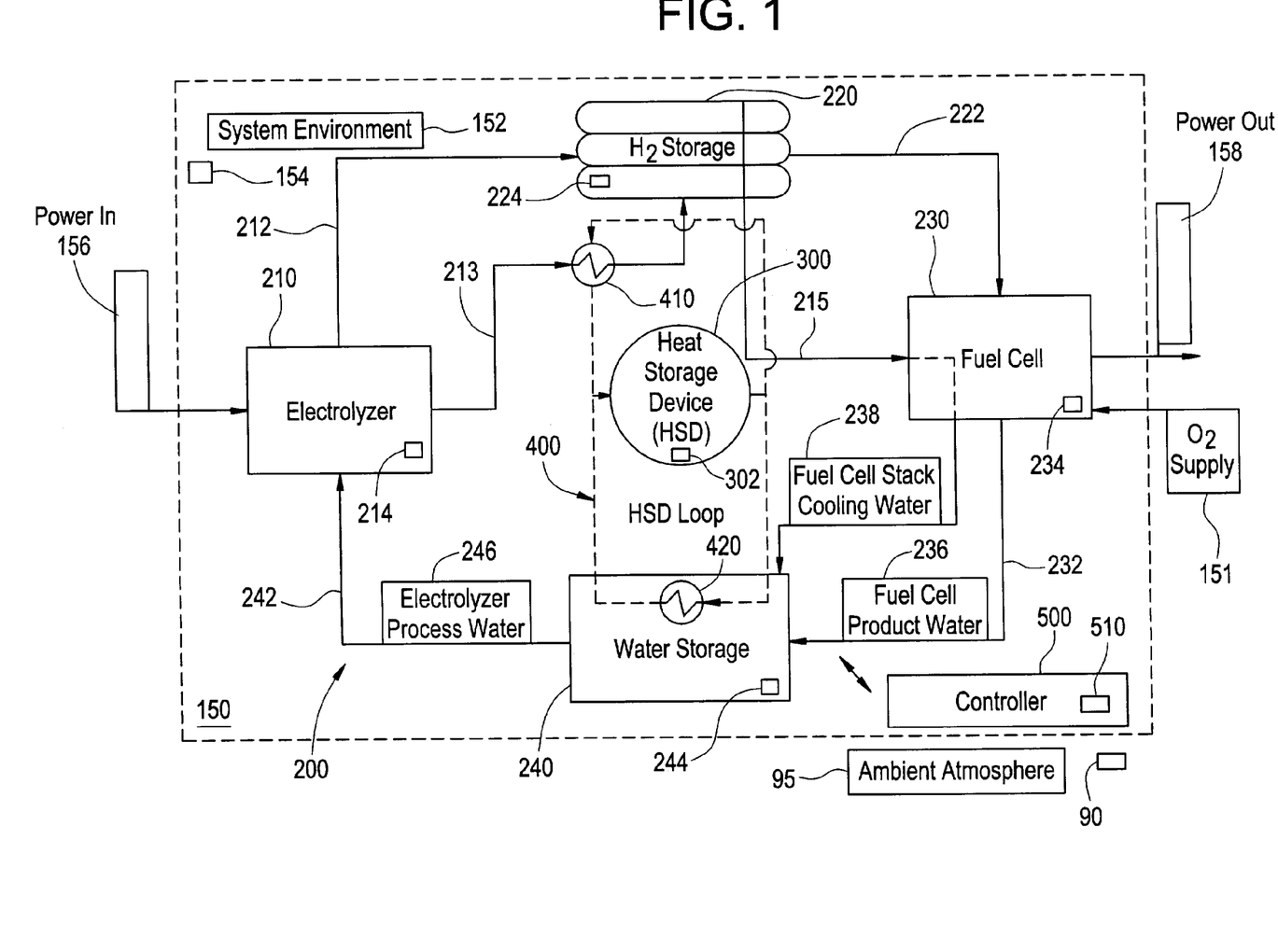
FIG. 1 is an exemplary fuel cell system for implementing an embodiment of the invention.

FIG. 1 is an exemplary embodiment of a fuel cell system (FCS) 150 having a regenerative fuel cell apparatus (RFC) 200 and a heat storage device (HSD) 300 in fluid communication with and responsive to RFC 200. As used, and described further, herein, HSD 300 is a device for storing heat and not merely for transferring heat from a heat source to a heat sink. As also used herein, fluid communication is intended to apply to a gas, a liquid or a solid as long as the heat transfer medium is portable and therefore fluidly communicable from one location to another. In an embodiment, RFC 200 includes an electrolyzer (electrolysis module) 210, a hydrogen storage device 220, a fuel cell (fuel cell module) 230, a water storage device 240, and interconnected fluid communication paths 212 (hydrogen), 222 (hydrogen), 232 (product water), 242 (process water). A distinction between FCS 150 and RFC 200 is that FCS 150 includes HSD 300, whereas RFC 200 does not. RFC 200 is regenerative in that electrolyzer 210 uses water and generates hydrogen for use at fuel cell 230, and fuel cell 230 uses hydrogen and generates water for use at electrolyzer 210. RFC 200 and HSD 300 include a thermal conduit system (TCS) 400 (represented by dashed lines) for transferring heat from RFC 200 to HSD 300 and vice versa. Within TCS 400 is a thermal switch (alternatively a heat transfer unit) 410 that directs the flow of a heat transfer medium, such as water for example, according to the operating characteristics of FCS 150, to be discussed below. A heat transfer unit 420 at water storage device 240 provides a means for transferring heat from HSD 300 to water storage device 240. A controller 500, in signal communication with RFC 200, HSD 300, the ambient atmosphere 95, and the system environment 152, includes a processor 510 that controls the heat transfer between RFC 200 and HSD 300 in response to signals from thermal sensors 90, 154, 214, 224, 234, 244, and 302. An alternative embodiment of controller 500 may be viewed as controlling the system defined by FCS 150. Fluid communication paths 212, 222, 232, 242, and TCS 400 include pumps and valves (not shown) that are in signal communication with and controlled by controller 500 for providing the desired water flow. While embodiments of the invention depict water as a heat transfer medium, which is readily mixable with product and process water (system water) 236, 246, alternative portable heat transfer mediums may also be employed where the heat transfer medium and the product/process water are kept isolated from one another. Such alternative portable heat transfer mediums include but are not limited to salt media, saline solution, and phase change material, for example. In an embodiment using a portable heat transfer medium other than water, heat transfer unit 410 serves to limit the interaction between the heat transfer medium and the system water. If a non-water heat transfer medium is employed, then the predefined temperature referred to herein is that temperature at which the heat transfer medium is not effective for transferring heat. For example, the predefined temperature for water may be the freezing temperature of 0-degrees-Celcius (degC.) (but may be other than 0-deg C. depending on the purity level and ambient conditions, such as pressure), the predefined temperature of a saline solution may be substantially lower than 0-deg C., and the predefined temperature of a phase change material may be substantially higher than 0-deg C. In general, the predefined temperature is that temperature at which the heat transfer medium becomes immobile and ineffective in transferring heat.

Figure 2:
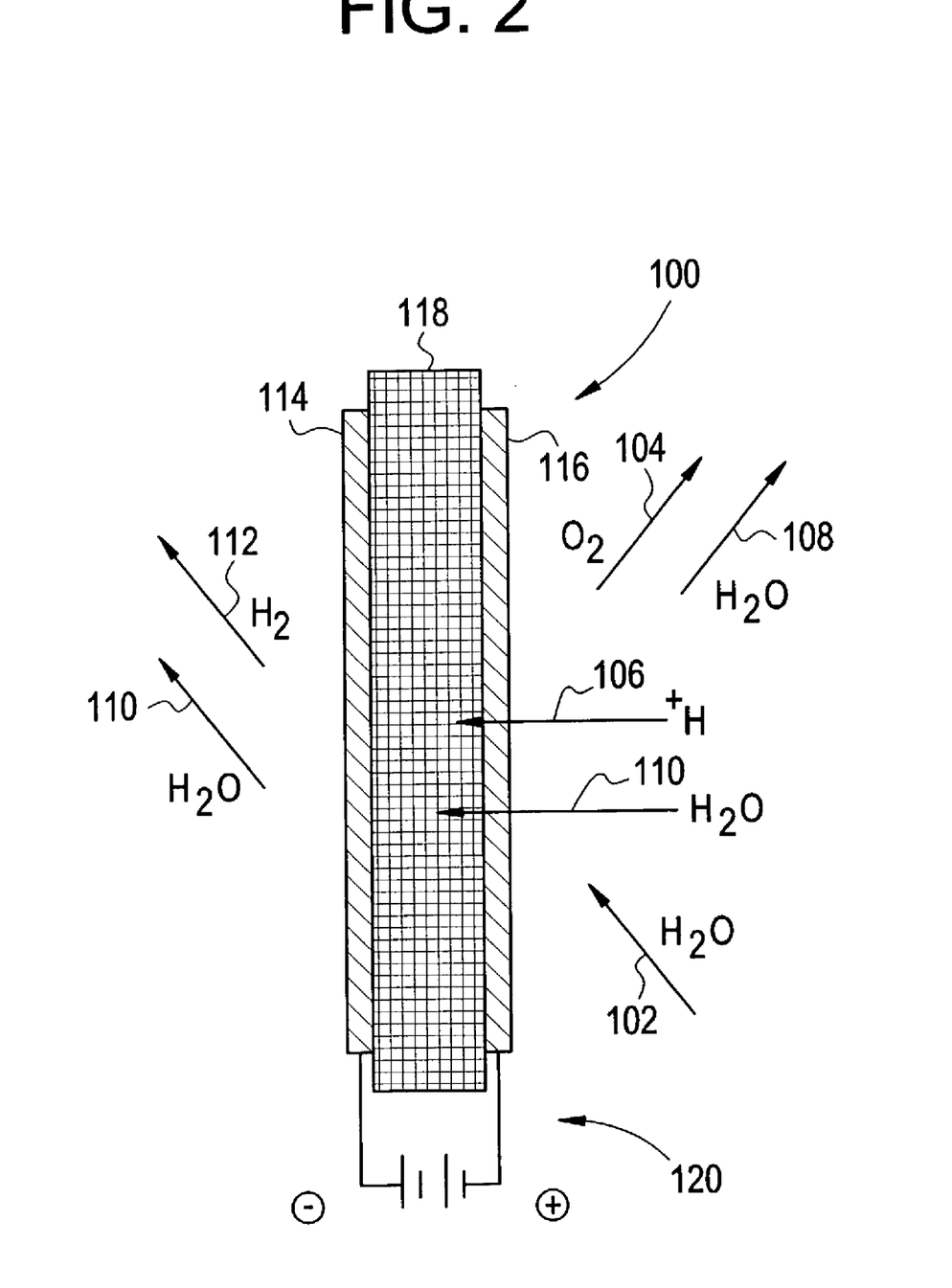
FIG. 2 is an exemplary side view of an energy conversion module for use in the system of FIG. 1.

Electrolyzer 210 and fuel cell 230 may, depending on system demand, include any number of energy conversion modules 100, best seen by referring to FIG. 2, which either generate hydrogen (electrolyzer 210) or electricity (fuel cell 230) depending on the manner employed. Referring now to FIG. 2, energy conversion module 100 includes an electrolyte 118 disposed between and in ionic communication with electrodes 114, 116.

When energy conversion module 100 is employed as an electrolyzer 210, electrode 116 is in fluid communication with a water source 240, while electrode 114 is in fluid communication with fuel cell 230, preferably via a phase separation device (not shown) and hydrogen storage device 220. In response to electrodes 114, 116 being energized via a power-in device 156, such as a battery (not shown) or energized fuel cell 230 for example, electrolyzer 210 effectuates the separation of water from water storage 240 to produce hydrogen that is stored at hydrogen storage device 220 for subsequent use at fuel cell 230. Unprocessed water, a byproduct of electrolyzer 210, is returned to water storage device 240.

When energy conversion module 100 is employed as a fuel cell 230, electrode 114 is in fluid communication with a hydrogen supply, such as hydrogen storage device 220 or energized electrolyzer 210 for example, while electrode 116 is in fluid communication with an oxygen supply 151, via ambient atmosphere 95 and a blower (not shown) for example. In response to the reaction of hydrogen ions and oxygen at electrolyte 118 and between electrodes 114, 116, fuel cell 230 effectuates the recombination of hydrogen and oxygen to produce electricity, designated as power-out 158, for external consumption, and product water 236, which is stored at water storage device 240.

Figure 3:
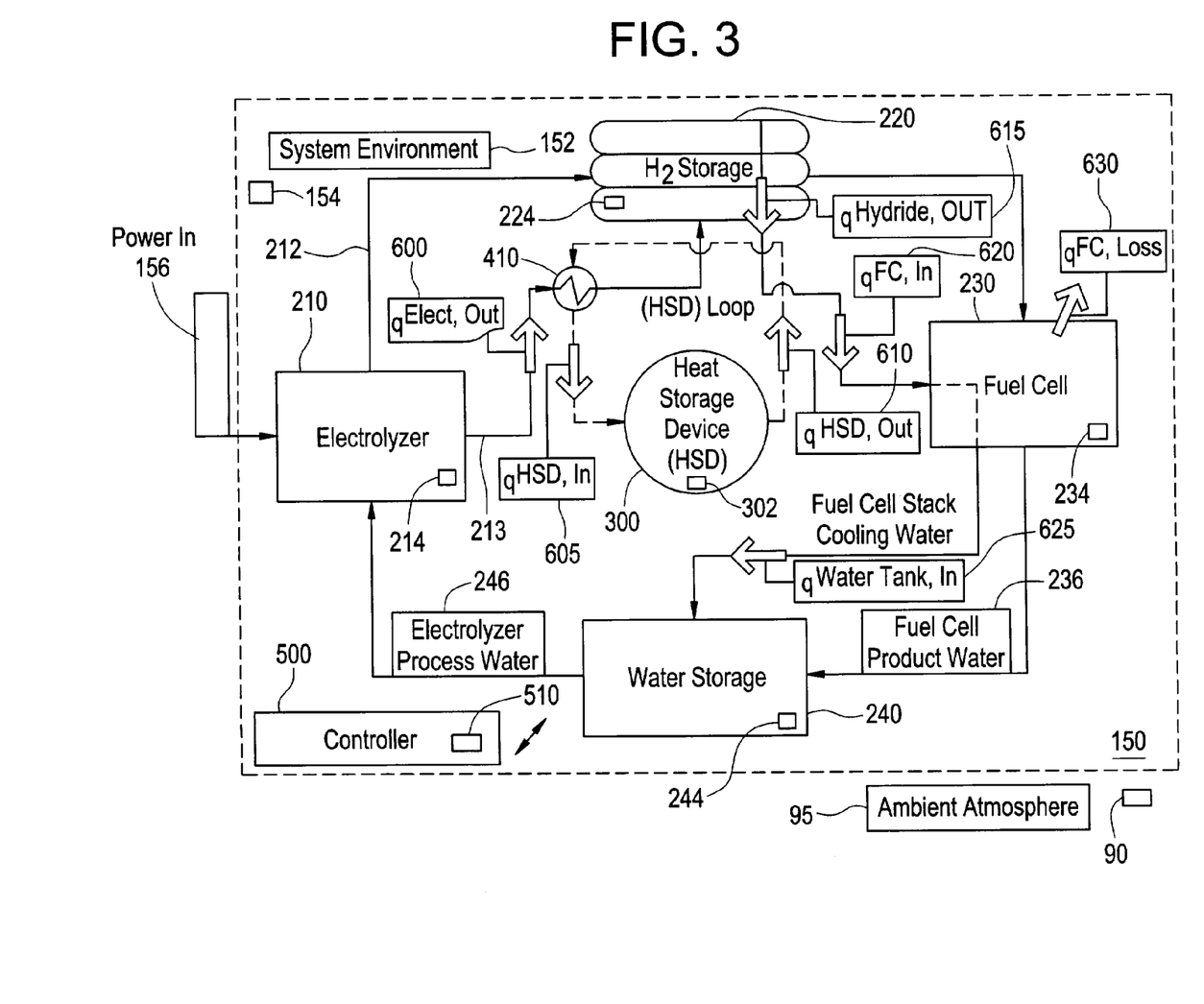
FIGS. 3–6 are exemplary fuel cell systems depicting alternative heat transfer arrangements to that depicted in FIG. 1.
Figure 4:
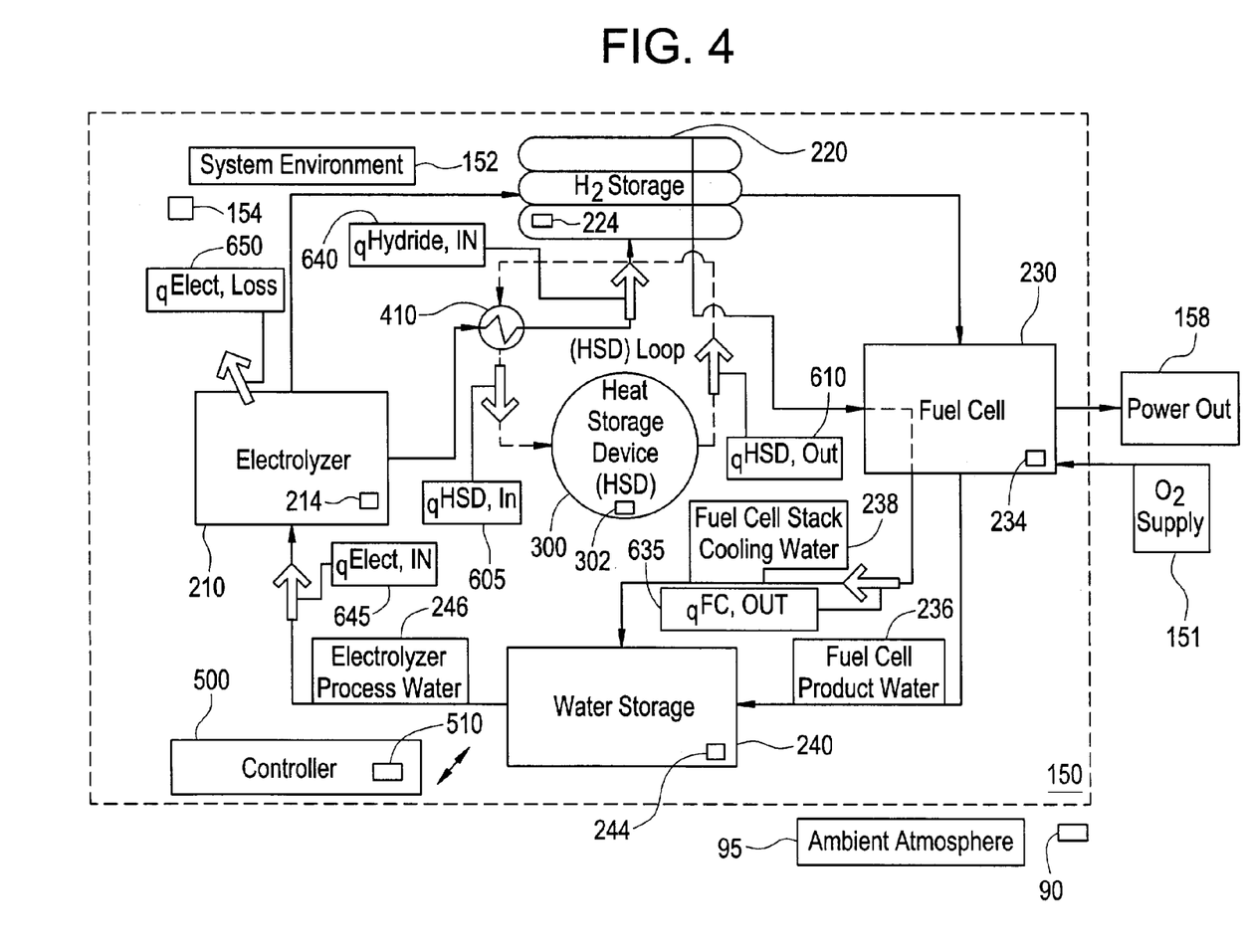

The operation of RFC 200 also results in the production of heat at electrolyzer 210 when operating in electrolysis mode (FIG. 3), and at fuel cell 230 when operating in fuel cell mode (FIG. 4). Instead of discharging this byproduct heat to ambient 95, an embodiment of FCS 150 employs HSD 300 and TCS 400 in conjunction with controller 500 to maintain the temperature of various system components above a predefined temperature, such as the freezing temperature of water for example, thereby enabling cold ambient operation of FCS 150, such as at high altitudes for example.

Referring now to FIG. 3, which depicts FCS 150 operating in electrolysis mode, electrolyzer 210 receives power from power-in device 156 and process water 246 from water storage device 240, thereby producing hydrogen, in line 212, and exhaust water, in line 213, as discussed above. Heat generated at electrolyzer 210 is discharged in the exhaust water as represented by $q^{Elect, Out}$ 600, which is directed through thermal switch 410 to HSD 300 as represented by $q^{HSD, In}$ 605. HSD 300 retains the thermal energy represented by $q^{HSD, In}$ 605 by insulative means, and discharges heat represented by $q^{HSD, Out}$ 610 as demanded by controller 500, discussed in more detail below. The heat represented by $q^{HSD, Out}$ 610 may be recirculated back into HSD 300 or directed to hydrogen storage device 220 via thermal switch 410. In an alternative embodiment that includes a metal hydride as a hydrogen storage medium, a quantity of heat represented by $q^{Hydride, Out}$ 615 is released as hydrogen storage device 220 is filled with hydrogen gas. This quantity of heat, represented by $q^{Hydride, Out}$ 615, is directed to water storage device 240 via fuel cell 230. That portion of $q^{Hydride, Out}$ 615 entering fuel cell 230 is represented by $q^{FC, In}$ 620, and that portion entering water storage device 240 is represented by $q^{Water Tank, In}$ 625. In an embodiment where a metal hydride is not employed as a hydrogen storage medium, then $q^{Hydride, Out}$ 615 is zero. The heat loss occurring at fuel cell 230 is represented by $q^{FC, Loss}$ 630, which represents the amount of energy to avoid sub-freezing temperatures at fuel cell 230. In determining whether heat needs to be transferred from HSD 300 to other system components, processor 510 at controller 500 evaluates the following equation:

$$q^{FC, Loss} < q^{Elect, Out} + q^{Hydride, Out} + q^{HSD, Net} - q_{Losses} \qquad \text{Equa. 1.}$$

where $$q^{HSD, Net} = q^{HSD, In} - q^{HSD, Out}$$

and $q_{Losses}$=heat lost to ambient atmosphere.

In general, it is desirable for the amount of energy loss in FCS 150 during electrolysis mode to be less than the overall energy available from the surrounding systems in order to maintain above-freezing temperatures; that is, $T_{FCS}$ (temperature of FCS 150)>0 deg-C. (degree Celsius). If Equation 1 is true, then in an embodiment $T_{FCS}$>0 deg-C., and if Equation 1 is false, then $T_{FCS}$<0 deg-C. By evaluating Equation 1, controller 500 can determine whether the rate of heat transfer from HSD 300 to other system components should be modified. Additionally, by evaluating Equation 1 in combination with information from thermal sensors 90, 154, 214, 224, 234, 244, and 302, controller 500 can modify the flow of water, or more generally the flow of portable heat transfer medium, using pumps and valves (not shown but discussed above), for efficient use of the available thermal energy, or controller 500 can determine whether FCS 150 should be changed from electrolysis mode to another mode, thereby changing the rate of heat production.

Referring now to FIG. 4, which depicts FCS 150 operating in fuel cell mode, fuel cell 230 receives hydrogen from hydrogen storage device 220 and oxygen from oxygen supply 151, thereby producing electricity, depicted as power out 158, and product water 236 that is stored at water storage device 240, as discussed above. Heat generated at fuel cell 230 is discharged in fuel cell cooling water 238 as represented by $q^{FC, Out}$ 635, which is directed to water storage device 240 for subsequent use. In an alternative embodiment, $q^{FC, Out}$ 635 also represents the heat generated at fuel cell 230 and delivered to water storage device 240 via fuel cell product water 236. In a further alternative embodiment, $q^{FC, Out}$ 635 represents the summation of the heat generated at fuel cell 230 and discharged in fuel cell cooling water 238 plus the heat generated at fuel cell 230 and delivered to water storage device 240 via fuel cell product water 236. HSD 300, under the control of controller 500 as discussed in more detail below, discharges the thermal energy represented by $q^{HSD, Out}$ 610 to thermal switch 410, which directs a portion of the heat represented by $q^{Hydride, In}$ 640 to hydrogen storage device 220, and a portion of the heat represented by $q^{HSD, In}$ 605 back to HSD 300. The heat represented by $q^{Hydride, In}$ 640 is that amount of heat, in an alternative embodiment employing a metal hydride as a hydrogen storage medium, that is extracted to cool the metal hydride before storing the hydrogen gas in hydrogen storage device 220. In an embodiment where a metal hydride is not employed as a hydrogen storage medium, then $q^{Hydride, In}$ 640 is zero. Process water 246 from water storage device 240 provides heat represented by $q^{Elect, In}$ 645 to electrolyzer 210, which retains some heat to keep electrolyzer 210 from freezing and discharges some lost heat represented by $q^{Elect, Loss}$ 650 to system environment 152, the term $q^{Elect, Loss}$ 650 represents the total amount of energy to avoid sub-freezing temperatures at electrolyzer 210. In determining whether heat needs to be transferred from HSD 300 to other system components, processor 510 at controller 500 evaluates the following equation:

$$q^{Elect, Loss} < q^{FC, Out} + q^{Hydride, Out} + q^{HSD, Net} - q_{Losses} \quad \text{Equa. 2.}$$

where $$q^{HSD, Net} = q^{HSD, In} - q^{HSD, Out}$$

and $q_{Losses}$ = heat lost to ambient atmosphere.

In general, it is desirable for the amount of energy loss in FCS 150 during fuel cell mode to be less than the overall energy available from the surrounding systems in order to maintain above-freezing temperatures; that is, $T_{FCS} > 0$ deg-C. If Equation 2 is true, then in an embodiment $T_{FCS} > 0$ deg-C., and if Equation 2 is false, then $T_{FCS} < 0$ deg-C. By evaluating Equation 2, controller 500 can determine whether the rate of heat transfer from HSD 300 to other system components should be modified. Additionally, by evaluating Equation 2 in combination with information from thermal sensors 90, 154, 214, 224, 234, 244, and 302, controller 500 can modify the flow of water for efficient use of the available thermal energy as discussed above, or controller 500 can determine whether FCS 150 should be changed from fuel cell mode to another mode, thereby changing the rate of heat production.

In response to FCS 150 operating in idle mode, that is, when electrolyzer 210 is not operating in electrolysis mode and fuel cell 230 is not operating in fuel cell mode, processor 510 at controller 500 evaluates the following equation to determine whether heat needs to be transferred from HSD 300 to other system components:

$$q^{Elect, Loss} + q^{FC, Loss} < q^{HSD, Net} - q_{Losses} \quad \text{Equa. 3}$$

In general, it is desirable for the amount of energy loss in FCS 150 during idle mode to be less than the overall energy available from the surrounding systems in order to maintain above-freezing temperatures; that is, $T_{FCS} > 0$ deg-C. If Equation 3 is true, then in an embodiment $T_{FCS} > 0$ deg-C., and if Equation 3 is false, then $T_{FCS} < 0$ deg-C. By evaluating Equation 3, controller 500 can determine whether the rate of heat transfer from HSD 300 to other system components should be modified. Additionally, by evaluating Equation 3 in combination with information from thermal sensors 90, 154, 214, 224, 234, 244, and 302, controller 500 can modify the flow of water for efficient use of the available thermal energy as discussed above, or controller 500 can determine whether FCS 150 should be changed from an idle mode to a non-idle mode, thereby providing a source of additional heat.

Figure 5:
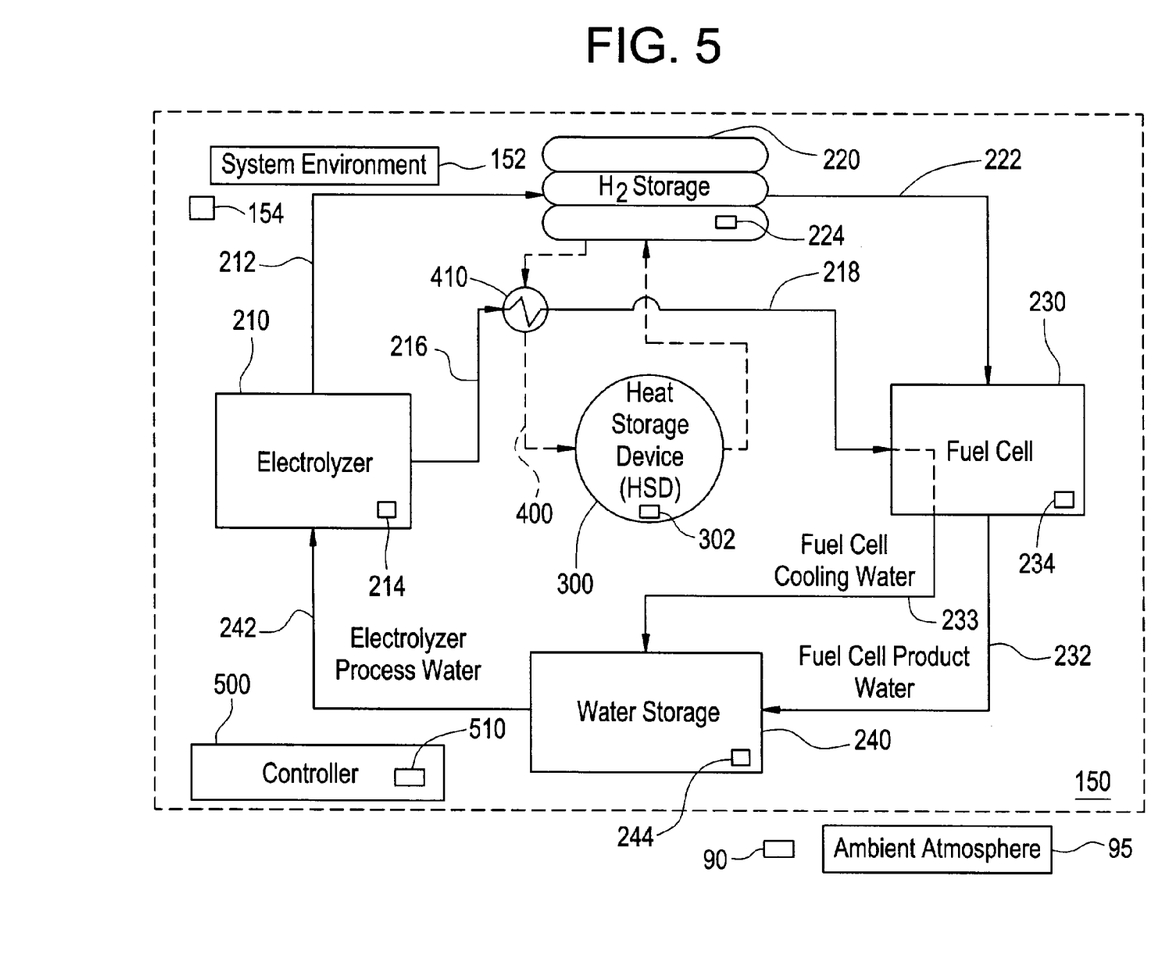
Figure 6:
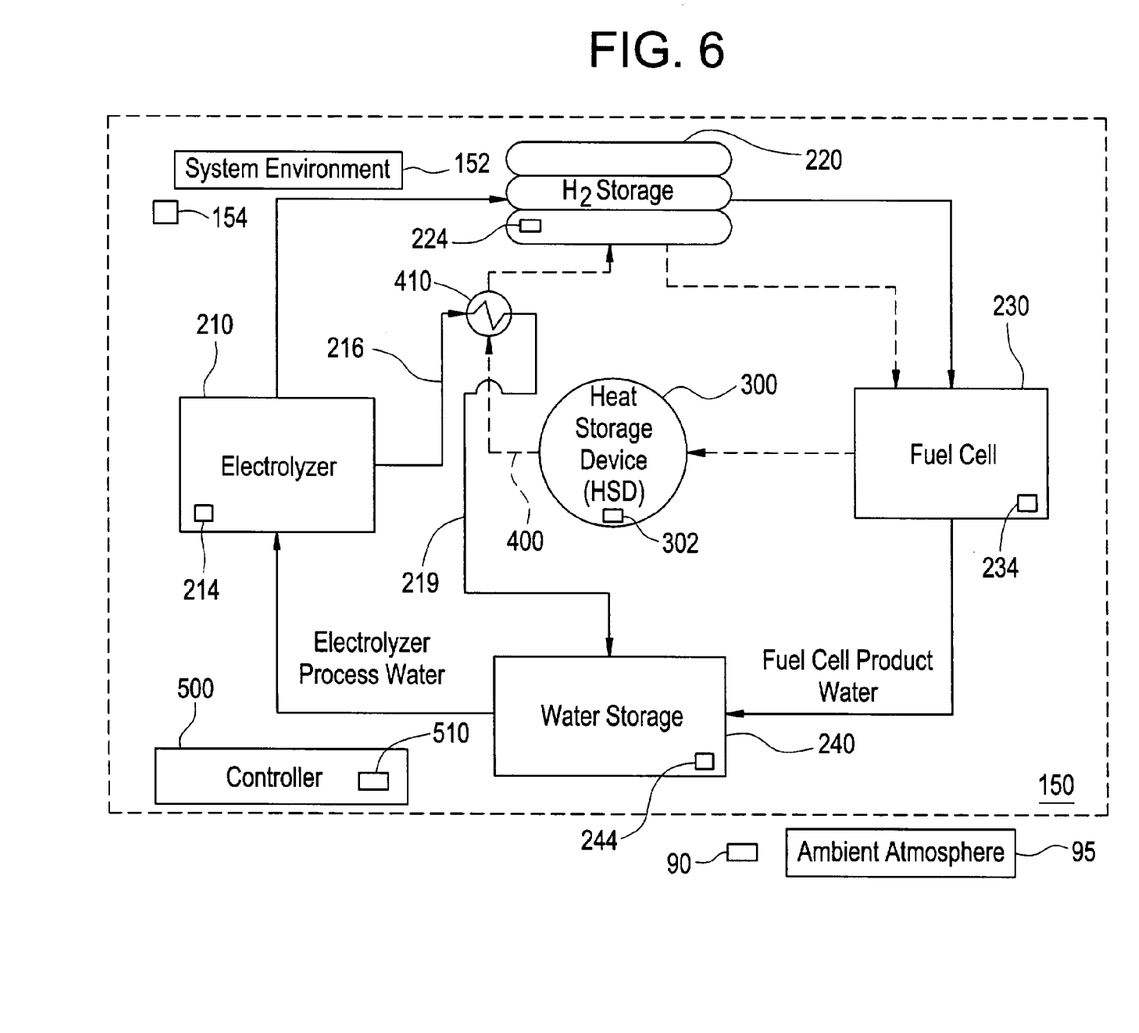

FIGS. 5 and 6 depict alternative embodiments whereby controller 500 controls the heat transfer among and between components of FCS 150. As depicted in FIG. 5, HSD 300 is in fluid communication with hydrogen storage device 220 and heat transfer unit 410 via TCS 400 (dashed lines), and electrolyzer 210 is in fluid communication with heat transfer unit 410, fuel cell 230, and water storage device 240 via fluid paths 216, 218, and 233. As depicted in FIG. 6, HSD 300 is in fluid communication with heat transfer unit 410, hydrogen storage device 220, and fuel cell unit 230 via TCS 400, and electrolyzer 210 is in fluid communication with heat transfer unit 410 and water storage device 240 via fluid paths 216 and 219. Other embodiments for controlling the heat transfer among and between components of FCS 150, while not depicted, may also be employed. As discussed above, processor 510 at controller 500 utilizes thermal sensors 90, 154, 214, 224, 234, 244, and 302, Equations 1–3, and pumps and valves (not shown), to manage the heat transfer among and between the various components of FCS 150 to maintain above-freezing temperatures.

Some embodiments of the invention have the advantage of: low weight and low cost as a result of the absence of an auxiliary heating system; high energy efficiency as a result of the fuel cell system using byproduct heat; an absence of coolants that can pollute proton exchange membranes (PEM); and, reduced complexity as a result of controlled information processing.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. A fuel cell system, comprising:
    a regenerative fuel cell apparatus comprising an electrolysis module for producing hydrogen, a fuel cell module responsive to the hydrogen for producing electricity, a water storage device in fluid communication with the electrolysis and fuel cell modules for providing water to the electrolysis module and for receiving water from the fuel cell module, and a hydrogen storage device in fluid communication with the electrolysis and fuel cell modules for receiving hydrogen from the electrolysis module and for providing hydrogen to the fuel cell module;
    a heat storage device in fluid communication with and responsive to the fuel cell apparatus, the heat storage device adapted to receive and store heat from and deliver heat to the fuel cell apparatus, wherein the heat storage device includes a portable heat transfer medium for effecting the transfer of heat;
    a controller in signal communication with the fuel cell apparatus and the heat storage device, the controller adapted to control heat transfer between the fuel cell apparatus and the heat storage device in response to signals from the fuel cell apparatus; and
    at least one temperature sensor in signal communication with at least one of the fuel cell apparatus, the heat storage device, and the controller;

wherein the controller is adapted to control the transfer of heat originating from at least one of the electrolysis module, the fuel cell module, and the hydrogen storage device to the heat storage device, and to control the transfer of heat from the heat storage device to at least one of the electrolysis module, the fuel cell module, the hydrogen storage device and the water storage device, thereby maintaining the temperature of at least one of the electrolysis module, the fuel cell module, the hydrogen storage device and the water storage device above a predefined temperature;

wherein the controller includes a processor programmed to:

evaluate if $$q^{FC, Loss} < q^{Elect, Out} + q^{Hydride, Out} + q^{HSD, Net} - q_{Losses}$$

in response to the fuel cell apparatus operating in electrolysis mode;

evaluate if $$q^{Elect, Loss} < q^{FC, Out} + q^{Hydride, Out} + q^{HSD, Net} - q_{Losses}$$

in response to the fuel cell apparatus operating in fuel cell mode; and evaluate if $$q^{Elect, Loss} + q^{FC, Loss} < q^{HSD, Net} - q_{Losses}$$

in response to the fuel cell apparatus operating in idle mode.

2. The system of claim 1, further comprising:
a heat flow switch in fluid communication with the electrolysis module, the hydrogen storage device, and the heat storage device, and in signal communication with the controller;

wherein the controller is adapted to control the transfer of heat from the electrolysis module through the heat flow switch and to the heat storage device in response to the electrolysis module being operational, and to control the transfer of heat from the heat storage device through the heat flow switch and to the hydrogen storage device in response to the electrolysis module not being operational.

3. The system of claim 1, wherein the heat transfer medium is at least one of water, a salt medium, a saline solution, and a phase change material.

4. The system of claim 1, wherein:
the predefined temperature is 0-degC.

5. A fuel cell system, comprising:
a fuel cell apparatus;
means for storing a portable heat transfer medium;
means for communicating the portable heat transfer medium between a heat storage device and the fuel cell apparatus;
means for maintaining the temperature of the fuel cell apparatus and the heat storage device above a predefined temperature;
wherein the means for maintaining comprises:
means for evaluating if $$q^{FC, Loss} < q^{Elect, Out} + q^{Hydride, Out} + q^{HSD, Net} - q_{Losses}$$

in response to the fuel cell apparatus operating in electrolysis mode;
means for evaluating if $$q^{Elect, Loss} < q^{FC, Out} + q^{Hydride, Out} + q^{HSD, Net} - q_{Losses}$$

in response to the fuel cell apparatus operating in fuel cell mode; and
means for evaluating if $$q^{Elect, Loss} + q^{FC, Loss} < q^{HSD, Net} - q_{Losses}$$

in response to the fuel cell apparatus operating in idle mode.

6. The system of claim 5, further comprising:
means for controlling the transfer of heat from an electrolysis module of the fuel cell apparatus to the heat storage device in response to the fuel cell apparatus being in an electrolysis mode; and
means for controlling the transfer of heat from the heat storage device to a hydrogen storage device of the fuel cell apparatus in response to the fuel cell apparatus being in a fuel cell mode.

7. The system of claim 5, wherein the fuel cell apparatus comprises a regenerative fuel cell apparatus.

8. The system of claim 1, wherein:
the heat storage device is configured to receive and store heat from and deliver heat to the fuel cell apparatus such that the fuel cell apparatus is maintained at a temperature above a predefined temperature.

* * * * *